(12) United States Patent
Asakura et al.

(10) Patent No.: US 10,046,791 B2
(45) Date of Patent: Aug. 14, 2018

(54) MOISTURE SENSOR AND STEERING SYSTEM

(71) Applicant: JTEKT CORPORATION, Osaka-shi, Osaka (JP)

(72) Inventors: Toshihiro Asakura, Chiryu (JP); Keisuke Ogawa, Toyota (JP); Hiroyuki Toyoda, Mie-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 108 days.

(21) Appl. No.: 15/233,100

(22) Filed: Aug. 10, 2016

(65) Prior Publication Data

US 2017/0050669 A1 Feb. 23, 2017

(30) Foreign Application Priority Data

Aug. 21, 2015 (JP) ................................. 2015-163970

(51) Int. Cl.
*B62D 5/04* (2006.01)
*B62D 5/00* (2006.01)
(Continued)

(52) U.S. Cl.
CPC ........... *B62D 5/0481* (2013.01); *B62D 5/008* (2013.01); *B62D 5/0448* (2013.01);
(Continued)

(58) Field of Classification Search
CPC .... B62D 5/0481; B62D 5/008; B62D 5/0448; H01M 10/425; H01M 2010/4278; H01M 2220/20
(Continued)

(56) References Cited

U.S. PATENT DOCUMENTS

2012/0292183 A1 11/2012 Thery et al.
2017/0341681 A1* 11/2017 Shiino .................. B62D 5/0481

FOREIGN PATENT DOCUMENTS

FR 2906037 A1 3/2008
FR 2955665 A1 7/2011
(Continued)

OTHER PUBLICATIONS

Feb. 21, 2017 Search Report issued in European Patent Application No. 16183765.3.

*Primary Examiner* — Joseph M Rocca
*Assistant Examiner* — Felicia L. Brittman
(74) *Attorney, Agent, or Firm* — Oliff PLC (57) ABSTRACT

A recessed portion is formed in an inner wall surface of a lower portion of a reduction gear housing (a lower wall in FIG. 2) in the direction of gravity and between a bearing 44 and an outer wall of the reduction gear housing (a right side wall in FIG. 2). The recessed portion is formed to have such a depth that the recessed portion does not penetrate the reduction gear housing. The recessed portion is formed in the reduction gear housing within a given range in a circumferential direction with respect to the axis of a rack shaft serving as the center. A moisture sensor is mounted in the recessed portion to detect water infiltrating into a housing. The moisture sensor has a transmission circuit that operates using a water battery as a power supply source. The water battery generates power when water flows into the water battery.

4 Claims, 4 Drawing Sheets (51) Int. Cl.
    *H01M 10/48*     (2006.01)
    *H01M 10/42*     (2006.01)

(52) U.S. Cl.
    CPC ......... *H01M 10/425* (2013.01); *H01M 10/48* (2013.01); *H01M 2010/4278* (2013.01); *H01M 2220/20* (2013.01)

(58) Field of Classification Search
    USPC ........................................................ 180/444
    See application file for complete search history.

(56) References Cited

FOREIGN PATENT DOCUMENTS

| | | |
|---|---|---|
| JP | 2014-234102 A | 12/2014 |
| WO | 2008/052915 A1 | 5/2008 |

\* cited by examiner

MOISTURE SENSOR AND STEERING SYSTEM

INCORPORATION BY REFERENCE

The disclosure of Japanese Patent Application No. 2015-163970 filed on Aug. 21, 2015 including the specification, drawings and abstract, is incorporated herein by reference in its entirety.

BACKGROUND OF THE INVENTION

1. Field of the Invention

The invention relates to a moisture sensor and a steering system.

2. Description of the Related Art

Steering systems have been available which vary the angle of steered wheels by transmitting rotation of a steering shaft resulting from steering of a steering wheel to a rack-and-pinion mechanism as described in, for example, Japanese Patent Application Publication No. 2014-234102 (JP 2014-234102 A). The rack-and-pinion mechanism converts rotary motion of the steering shaft into linear motion of a rack shaft. The rack shaft and the rack-and-pinion mechanism are housed in a housing. Tie rods are coupled to respective opposite ends of the rack shaft via rack ends so as to be able to pivot. The linear motion of the rack shaft is transmitted to the steered wheels via the rack ends and the tie rods.

In the conventional rack-and-pinion steering systems including the steering system in JP 2014-234102 A, rack boots are provided at the respective opposite ends of the rack shaft. The rack boots seal portions between respective ends of the housing and the respective tie rods to restrain external foreign matter from entering a housing space in the housing. However, when one or both of the rack boots are broken to form an opening in the rack boot through which the housing space in the housing communicates with an external space, foreign matter such as water may enter the housing space in the housing via the opening. Particularly in winter, when water infiltrates into the housing space in the housing and adheres to a belt in a reduction gear apparatus that transmits motive power of a motor to the rack shaft, the belt may be frozen. Consequently, in the steering system described in JP 2014-234102 A, a moisture sensor (moisture detecting apparatus) is provided in a lower portion of the housing in a direction of gravity to detect water infiltrating into the housing space in the housing. The moisture sensor has a pair of electrodes. When a voltage is applied to a first electrode, the moisture sensor detects the water having infiltrated into the housing space if the voltage is applied to a second electrode via the water.

In the steering system in JP 2014-234102 A, the voltage is constantly (or with a constant period) applied to the first electrode in order that the moisture sensor detects water having infiltrated into the housing space. Thus, even during a normal state where no water has infiltrated into the housing space, the moisture sensor keeps consuming power.

SUMMARY OF THE INVENTION

It is an object of the present invention to provide a moisture sensor that consumes reduced power and a steering system including the moisture sensor.

According to a first aspect of the invention, a steering system includes:

a steered shaft that reciprocates in an axial direction;

a housing that houses the steered shaft;

tie rods provided at respective opposite ends of the steered shaft to couple the steered shaft and respective steered wheels together;

boots each connected between the housing and the corresponding tie rod to seal the housing and the tie rod; and a moisture sensor including a water battery that is internally supplied with a liquid to generate power, and a transmission circuit that transmits a signal by use of the water battery as a power supply source, the moisture sensor being disposed inside the housing.

In this configuration, for example, even if one or both of the rack boots are broken to cause water to infiltrate into the housing, whether a signal is being output from the moisture sensor disposed inside the housing is determined to enable determination of whether or not water is infiltrating into the housing. The moisture sensor consumes power only when water infiltrates into the housing. Accordingly, a steering system with reduced power consumption can be provided.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of a steering system will be described below. The steering system in the present embodiment is what is called a rack-parallel electric power steering system (RP-EPS).

Figure 1:
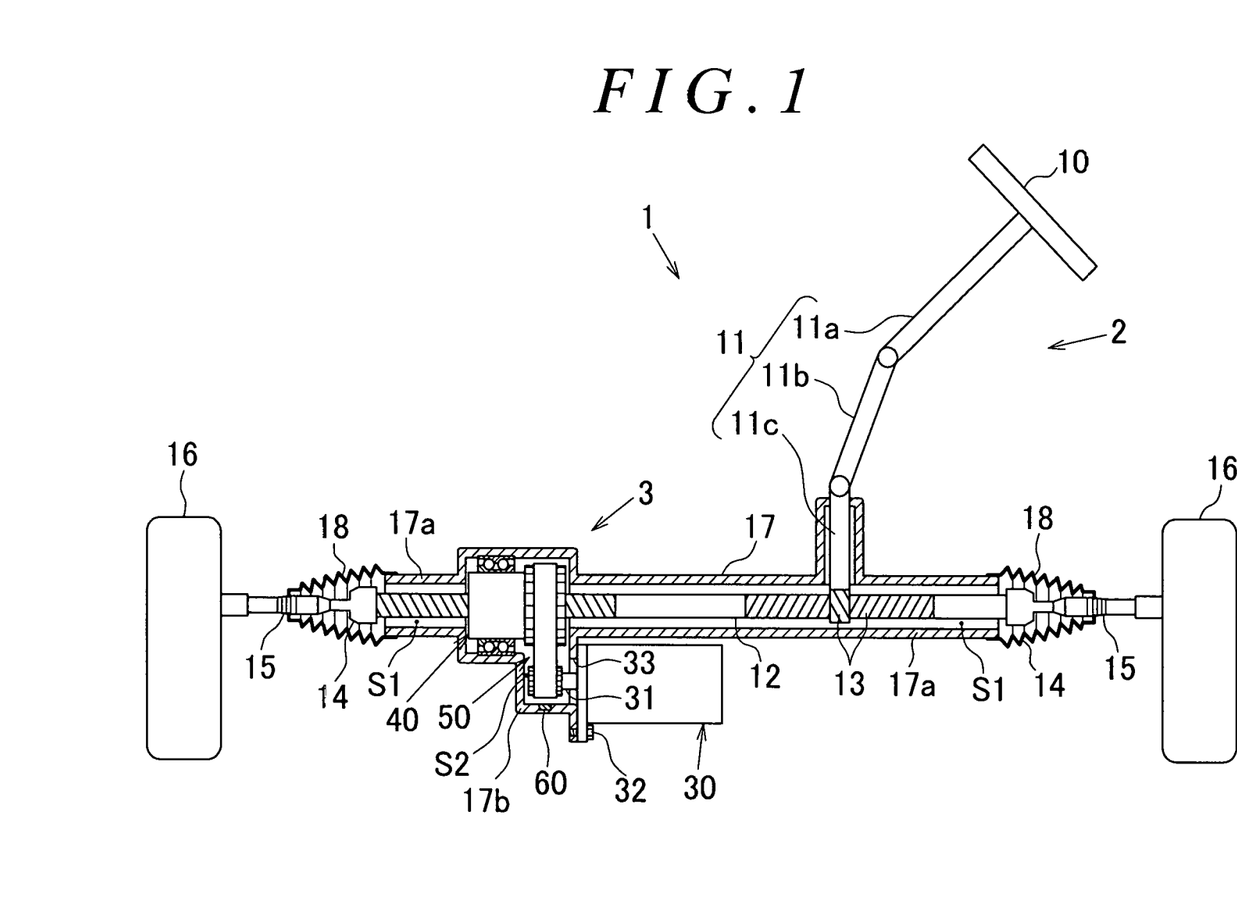
FIG. 1 is a diagram depicting a general configuration of an electric power steering system.

As depicted in FIG. 1, an EPS 1 includes a steering mechanism 2 that steers steered wheels 16 based on a driver's operation of a steering wheel 10 and an assist mechanism 3 that assists the driver's steering operation.

The steering mechanism 2 includes a steering wheel 10 and a steering shaft 11 that rotates integrally with the steering wheel 10. The steering shaft 11 has a column shaft 11a coupled to the steering wheel 10, an intermediate shaft 11b coupled to a lower end of the column shaft 11a, and a pinion shaft 11c coupled to a lower end of the intermediate shaft 11b. A lower end of the pinion shaft 11c is coupled to a rack shaft 12 via a rack-and-pinion mechanism 13. Therefore, the steering mechanism 2 converts rotary motion of the steering shaft 11 into reciprocating linear motion of the rack shaft 12 in an axial direction (a lateral direction in FIG. 1) via the rack-and-pinion mechanism 13, which includes the pinion shaft 11c and the rack shaft 12. The reciprocating linear motion is transmitted to tie rods 15 via rack ends 14 coupled to respective opposite ends of the rack shaft 12. Motion of the tie rods 15 is transmitted to the right and left steered wheels 16 to vary the steered angle of the steered wheels 16. Bellows-like tubular rack boots 18 are disposed between respective opposite ends of a housing 17 and the respective tie rods 15. Each of the rack ends 14 and a part of the corresponding tie rod 15 are covered by the corresponding rack boot 18. The rack boots 18 restrain foreign matter such as water and dust from entering the interior of the housing 17 and the interior of the rack ends 14.

The assist mechanism 3 is provided on the rack shaft 12. The assist mechanism 3 includes a motor 30 that is a source of an assist force, a ball screw mechanism 40 attached integrally around the rack shaft 12, and a reduction gear 50 that transmits a turning force of a rotating shaft 31 of the motor 30 to the ball screw mechanism 40. The assist mechanism 3 converts the turning force of the rotating shaft 31 of the motor 30 into a force applied to the rack shaft 12 in the axial direction, via the reduction gear 50 and the ball screw mechanism 40. The force applied to the rack shaft 12 in the axial direction corresponds to an assist force to assist the driver's steering operation.

The ball screw mechanism 40, the reduction gear 50, the pinion shaft 11c, and the rack shaft 12 are covered by the housing 17. The housing 17 is provided with insertion portions 17a through which the rack shaft 12 is inserted. The housing 17 has a reduction gear housing 17b that is a portion protruding in a direction (downward in FIG. 1) crossing a direction in which the rack shaft 12 extends. Apart of the reduction gear 50 is housed inside the reduction gear housing 17b. A through-hole 33 is formed in an outer wall (a right side wall in FIG. 1) of the reduction gear housing 17b. The rotating shaft 31 of the motor 30 extends into the reduction gear housing 17b though the through-hole 33 formed in the reduction gear housing 17b. The motor 30 is fixed to the reduction gear housing 17b via a bolt 32 such that the rotating shaft 31 is parallel to the rack shaft 12. A slight clearance S1 is formed between the insertion portion 17a and the rack shaft 12.

The bellows-like tubular rack boots 18 are disposed at the respective opposite ends of the housing 17 (insertion portions 17a). One end of each of the rack boots 18 is connected to a corresponding end of the housing 17, and the other end of the rack boot 18 is connected to the corresponding tie rod 15. The housing 17 and each of the rack ends 14 are covered by the corresponding rack boot 18. The rack boots 18 restrain foreign matter such as water and dust from entering the interior of the housing 17 and the interior of the rack ends 14.

Now, the assist mechanism 3 will be described in detail.

Figure 2:
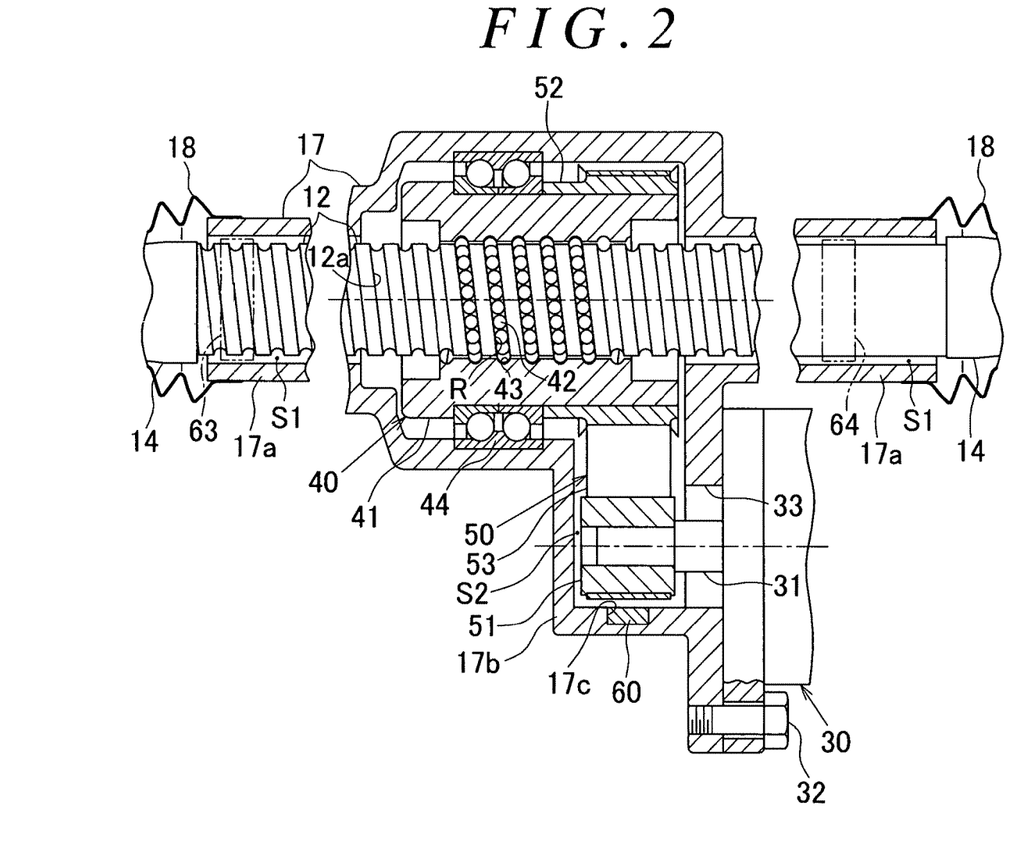
FIG. 2 is a sectional view depicting a general configuration of an assist mechanism for an electric power steering system according to an embodiment.

As depicted in FIG. 2, the ball screw mechanism 40 includes a cylindrical nut 41 that is threadedly engaged with the rack shaft 12 via a large number of balls 42. The nut 41 is supported via a cylindrical bearing 44 so as to be rotatable with respect to an inner peripheral surface of the housing 17. A spiral thread groove 12a is formed in an outer peripheral surface of the rack shaft 12. A spiral thread groove 43 corresponding to the thread groove 12a in the rack shaft 12 is formed in an inner peripheral surface of the nut 41. A spiral space enclosed by the thread groove 43 in the nut 41 and the thread groove 12a in the rack shaft 12 functions as a rolling path R through which the balls 42 roll. Although not depicted in the drawings, a circulation path is formed in the nut 41 so as to open at two positions in the rolling path R and communicate with the rolling path R via the two openings. Therefore, the balls 42 can circulate endlessly through the rolling path R via the circulation path in the nut 41. A lubricant such as grease, is applied to the rolling path R to reduce frictional resistance offered when the balls 42 roll.

The reduction gear 50 includes a drive pulley 51 attached integrally to the rotating shaft 31 of the motor 30, a driven pulley 52 attached integrally to an outer periphery of the nut 41, and a belt 53 passed between the drive pulley 51 and the driven pulley 52. The belt 53 may be, for example, a rubber toothed belt including core wires.

In the assist mechanism 3 configured as described above, rotation of the rotating shaft 31 of the motor 30 allows the drive pulley 51 to rotate integrally with the rotating shaft 31. Rotation of the drive pulley 51 is transmitted to the driven pulley 52 via the belt 53 to rotate the driven pulley 52. Thus, the nut 41 attached integrally to the driven pulley 52 also rotates integrally with the driven pulley 52. The nut 41 rotates relative to the rack shaft 12, and thus, the balls 42 interposed between the nut 41 and the rack shaft 12 are loaded in opposite directions and circulate endlessly through the rolling path R. The endless circulation of the balls 42 allows a torque applied to the nut 41 to be converted into a force applied to the rack shaft 12 in the axial direction. Thus, the rack shaft 12 moves in the axial direction with respect to the nut 41. The force applied to the rack shaft 12 in the axial direction acts as an assist force to assist the driver's steering operation.

When the EPS 1 is mounted in the vehicle, a recessed portion 17c is provided in an inner wall surface of a lower portion of the reduction gear housing 17b (a lower wall surface in FIG. 2) in the direction of gravity and between the bearing 44 and an outer wall of the reduction gear housing 17b (a right side wall in FIG. 2). The recessed portion 17c is formed to have such a depth that the recessed portion 17c does not penetrate the reduction gear housing 17b. The recessed portion 17c is formed in the reduction gear housing 17b within a given range in a circumferential direction with respect to the axis of the rack shaft 12 serving as the center. A moisture sensor 60 is mounted in the recessed portion 17c to detect water infiltrating into the housing 17.

Figure 3:
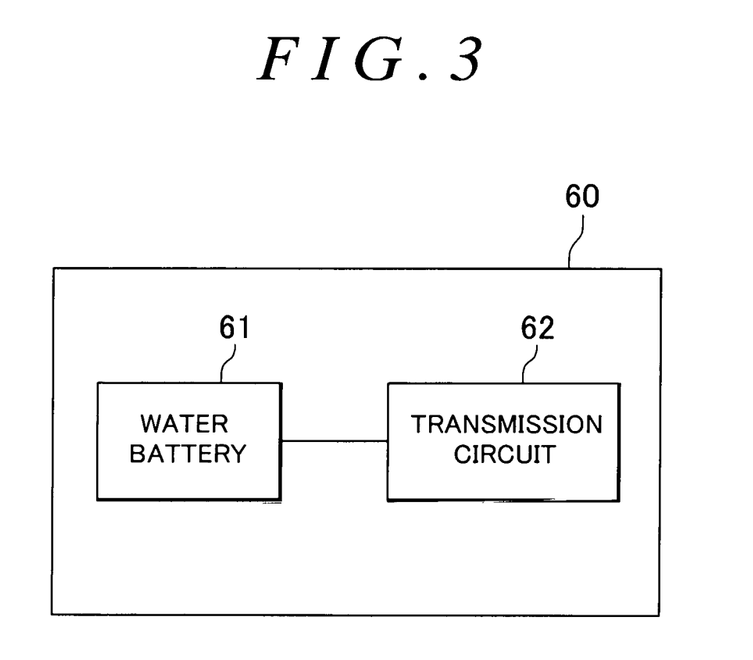
FIG. 3 is a diagram depicting a general configuration of a moisture sensor.

As depicted in FIG. 3, the moisture sensor 60 has a water battery 61 and a transmission circuit 62 that operates using the water battery as a source of power. The water battery 61 generates power when water flows into the water battery 61. When supplied with power from the water battery 61, the transmission circuit 62 outputs a wireless signal indicating that water has been detected in the reduction gear housing 17b. The water battery 61 cannot supply power when no water flows into the reduction gear housing 17b. Thus, the transmission circuit 62 outputs no signal.

The water battery 61 internally has two electrodes. When water flows in between the two electrodes, metal ions diffuse from the electrodes into the water, with electrons left in the electrodes. The electrons left in the electrodes flow into the transmission circuit 62, so that the transmission circuit 62 is supplied with power. In contrast, when no water is flowing into the water battery 61, the metal ions do not diffuse from the electrodes into the water, and thus the water battery 61 does not supply power to the transmission circuit 62.

By way of example, the internal structure of the water battery 61 will be specifically described. A first electrode of the water battery 61 is a positive electrode formed of magnesium, and a second electrode of the water battery 61 is a negative electrode formed of activated carbon. When water is supplied to the water battery 61, the magnesium electrode chemically reacts with oxygen in the water to become magnesium oxide. Since the magnesium and the oxygen are bonded together, the electrons are emitted from the magnesium. The electrons migrate from the positive electrode to the negative electrode via the transmission circuit 62. The transmission circuit 62 is thus supplied with power. The electrons having migrated to the negative electrode are received by the oxygen contained in the activated carbon. This change is consecutively repeated to allow the water battery 61 to supply power to the transmission circuit 62.

Figure 4:
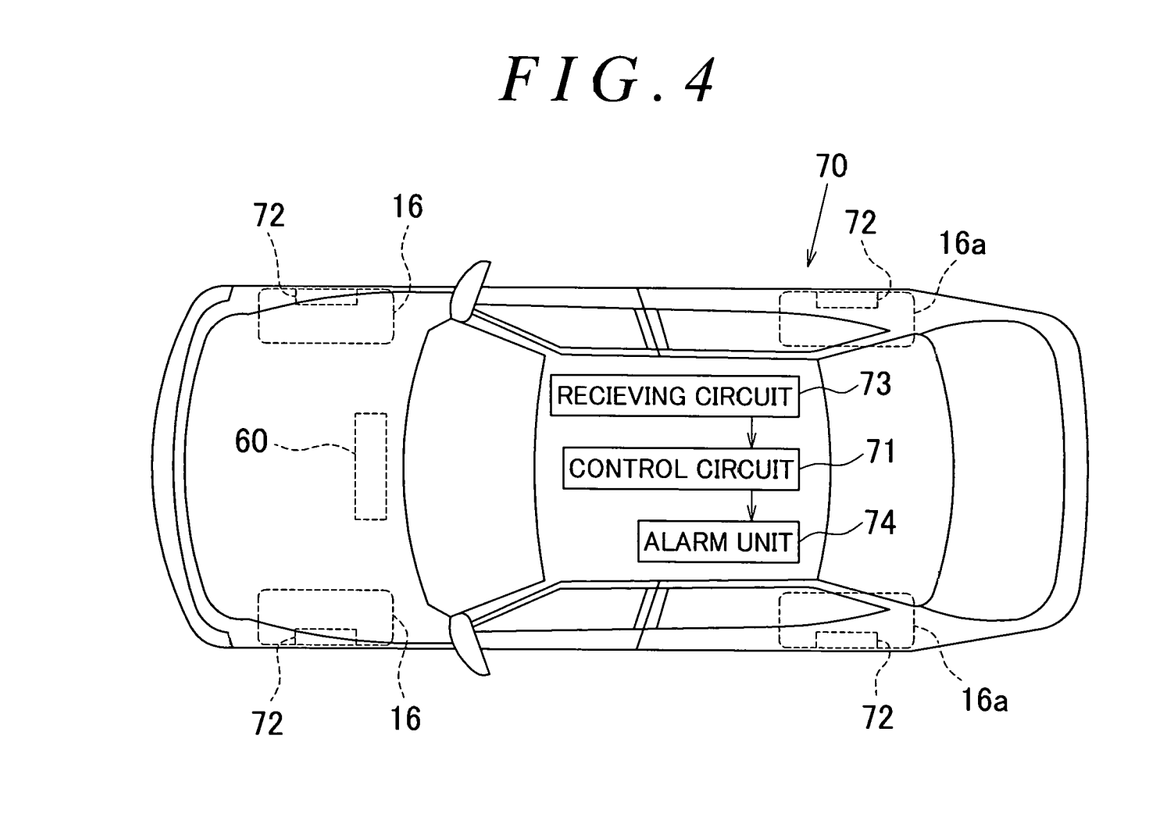
FIG. 4 is a schematic diagram depicting a general configuration of a vehicle including a moisture sensor and an air pressure monitoring system.

As depicted in FIG. 4, an air pressure monitoring system 70 is mounted in the vehicle in the present embodiment. The air pressure monitoring system 70 is a system in which information on the air pressures and temperatures of the steered wheels 16 and rear wheels 16a is detected via sensors provided in air pressure signal transmission circuits 72, each of the air pressure signal transmission circuits 72 transmits an air pressure signal containing the information on the detected air pressure and temperature to a receiving circuit 73, and a control circuit 71 notifies the driver of abnormality in any of the steered wheels 16 and the rear wheels 16a based on the air pressure signals obtained through the receiving circuit 73.

The air pressure monitoring system 70 includes the control circuit 71 that performs control of notifying the driver of abnormality, the air pressure signal transmission circuits 72 each of which detects information on the air pressure and temperature of the corresponding one of the steered wheels 16 and the rear wheels 16a, the receiving circuit 73 that receives the information (air pressure signals) from the air pressure signal transmission circuits 72, and an alarm unit 74 that notifies the driver of abnormality based on an output from the control circuit 71. The air pressure signal transmission circuits 72 and the receiving circuit 73 are wirelessly connected together. The control circuit 71 performs alarming via the alarm unit 74 based on the air pressure signals detected through the air pressure signal transmission circuits 72. For example, upon receiving a signal indicating that the air pressure of any of the steered wheels 16 and the rear wheels 16a is insufficient, the control circuit 71 causes the alarm unit 74 to issue an alarm indicating that the air pressure is insufficient. The alarm may be based on, for example, sound or text display.

The receiving circuit 73 also receives a signal which is output from the transmission circuit 62 of the moisture sensor 60 and indicates that water has been detected. The transmission circuit 62 and the receiving circuit 73 are wirelessly connected together. The moisture sensor 60 need not be externally supplied with power, and is thus independently disposed without connection to a battery or the like. The control circuit 71 causes the alarm unit 74 to issue an alarm upon receiving a signal indicating that water has been detected from the receiving circuit 73.

In the air pressure monitoring system 70, the position of the receiving circuit 73 is adjusted so as to vary the distance between the receiving circuit 73 and each of the air pressure signal transmission circuits 72, in order to determine from which of the air pressure signal transmission circuits 72 the signal has been obtained. Specifically, the receiving circuit 73 is disposed away from a central portion between the steered wheels 16 and the rear wheels 16a and also away from a central line between the steered wheel 16 and the steered wheel 16. Thus, even when the air pressure signal transmission circuits 72 output signals with the same intensity, since the distance between the receiving circuit 73 and each of the air pressure signal transmission circuits 72 varies, the signals received by the receiving circuit 73 have different intensities. Thus, for example, upon receiving a signal indicating that the air pressure is insufficient, the receiving circuit 73 can determine which of the steered wheels 16 and the rear wheels 16a has an insufficient air pressure.

A method for detecting infiltration of water into the housing 17 will be described in detail.

As depicted in FIG. 2, for example, water infiltrating through a crack in the rack boot 18 resulting from degradation of the rack boot 18 seeps through a clearance S1 formed between the insertion portion 17a of the housing 17 and the rack shaft 12. The water having infiltrated through the clearance S1 reaches a housing space S2 in the reduction gear housing 17b. The water having reached the housing space S2 reaches the recessed portion 17c provided in the lower portion of the reduction gear housing 17b in the direction of gravity and the moisture sensor 60 mounted in the recessed portion 17c.

The water having reached the moisture sensor 60 is supplied to the water battery 61 of the moisture sensor 60. The water battery 61 provides power, and the transmission circuit 62 outputs a signal indicating that water has been detected to the receiving circuit 73. Upon receiving, through the receiving circuit 73, the signal indicating that water has been detected, the control circuit 71 causes the alarm unit 74 to issue an alarm. The alarm notifies the driver that infiltration of water into the housing 17 has been detected.

Effects of the present embodiment will be described.

(1) Operation of the moisture sensor 60 relies on the water battery 61. Thus, the water battery 61 does not provide power and the moisture sensor 60 does not operate until water infiltrates into the reduction gear housing 17b. This enables a reduction in power consumption of the moisture sensor 60. The control circuit 71 can determine that water is present inside the housing 17 when the receiving circuit 73 receives, from the transmission circuit 62, the signal indicating that water has been detected. The control circuit 71 can determine that no water is present inside the housing 17 when the receiving circuit 73 receives no signal from the transmission circuit 62.

(2) The signal indicating that water has been detected in the housing 17 is transmitted from the transmission circuit 62 to the receiving circuit 73. Consequently, the signal is communicated to the driver by use of the air pressure monitoring system 70. Since the signal indicating that water has been detected in the housing 17 is communicated to the driver by use of the air pressure monitoring system 70, no new arrangement needs to be provided.

(3) Power for the moisture sensor 60 is supplied by the water battery 61, and thus, the moisture sensor 60 need not be connected to an in-vehicle battery by wire. If the moisture sensor 60 is connected to the battery by wire, an additional seal member that prevents adhesion of water to the wire needs to be provided in order to inhibit electric leakage. In the present embodiment, since the water battery 61 supplies power, the moisture sensor 60 can be independently provided. This eliminates the need to provide a seal member.

Now, a second embodiment of the RP-EPS according to the invention will be described. Mostly differences from the first embodiment will be described.

As depicted in FIG. 2, annular moisture sensors 63, 64 are each provided in the clearance S1 between a corresponding one of the two insertion portions 17a and the rack shaft 12. That is, each of the moisture sensors 63, 64 is provided between the corresponding rack boot 18 and the reduction gear housing 17b. Each of the moisture sensors 63, 64 is provided over a given range in the axial direction of the rack shaft 12.

Each of the moisture sensors 63, 64 has the water battery 61 and the transmission circuit 62, like the moisture sensor 60 in the first embodiment. By way of example, the moisture sensors 63, 64 are provided at similar distances from the respective steered wheels 16 in the axial direction of the rack shaft 12.

A method for detecting infiltration of water into the housing 17 will be described in detail. As depicted in FIG. 2, for example, water infiltrating through a crack in the rack boot 18 resulting from degradation of the rack boot 18 seeps through the clearance S1 formed between the insertion portion 17a of the housing 17 and the rack shaft 12. By way of example, water infiltrating through a crack in the rack boot 18 depicted in the left of FIG. 2 comes into contact with the moisture sensor 63 before reaching the housing space S2 in the reduction gear housing 17b. When the water having come into contact with the moisture sensor 63 flows into the moisture sensor 63, the water battery 61 in the moisture sensor 63 generates power. When supplied with the power generated by the water battery 61, the transmission circuit 62 outputs a signal indicating that water has been detected.

Upon receiving, through the receiving circuit 73, the signal indicating that water has been detected, the control circuit 71 causes the alarm unit 74 to issue an alarm. The alarm notifies the driver that infiltration of water into the housing 17 has been detected.

Since the moisture sensors 63, 64 are located at different distances from the receiving circuit 73, the control circuit 71, upon receiving the signal indicating that water has been detected through the receiving circuit 73, can determine which of the moisture sensors 63, 64 has output the signal indicating that water has been detected. Thus, the control circuit 71 can estimate which of the rack boots 18 has been broken.

Effects of the present embodiment will be described. (1) If water infiltrates into the housing 17 through a crack in the rack boot 18 resulting from degradation of the rack boot 18, infiltration of the water into the housing 17 can be detected via the moisture sensors 63, 64 provided in the respective insertion portions 17a. Thus, the present embodiment allows infiltration of water into the housing 17 to be more quickly detected than the embodiment in which the moisture sensor 60 is provided in the reduction gear housing 17b. (2) Providing the moisture sensors 63, 64 allows the control circuit 71 to estimate which of the rack boots 18 is degraded.

The embodiments may be varied as follows. Other embodiments described below may be combined together unless technical inconsistency arises. The first embodiment and the second embodiment may be combined together unless technical inconsistency arises.

In the first embodiment, the moisture sensor 60 is mounted in the recessed portion 17c. However, the invention is not limited to this. For example, the moisture sensor 60 may be bonded to an inner wall surface of the reduction gear housing 17b. Even in this case, when water having infiltrated into the moisture sensor 60 is supplied, infiltration of the water into the housing 17 can be detected.

In the second embodiment, the moisture sensors 63, 64 are provided at similar distances from the respective steered wheels 16 in the axial direction of the rack shaft 12. However, the invention is not limited to this. For example, the moisture sensor 63 may be provided at a longer distance from the corresponding steered wheel 16 than the moisture sensor 64. Even in this case, the control circuit 71 can estimate which of the rack boots is degraded when the moisture sensors 63, 64 are provided at different distances from the receiving circuit 73.

In the embodiments, the receiving circuit 73 in the air pressure monitoring system 70 is used as a receiving circuit that receives signals from the transmission circuit 62. However, the invention is not limited to this. For example, a receiving circuit dedicated to the transmission circuit 62 may be newly provided.

In the embodiments, the EPS 1 is provided with the air pressure monitoring system 70. However, the invention is not limited to this. That is, the EPS 1 need not be provided with the air pressure monitoring system 70.

In the second embodiment, both the moisture sensors 63, 64 are provided in the respective insertion portions 17a. However, the invention is not limited to this. At least one of the moisture sensors 63, 64 may be provided in the insertion portion 17a.

In the embodiments, the transmission circuit 62 and the receiving circuit 73 are wirelessly connected together. However, the invention is not limited to this. For example, even when power for the moisture sensor 60 is supplied by the water battery 61, the transmission circuit 62 and the receiving circuit 73 may be connected together by wire. In this case, a seal member is preferably provided which prevents water from adhering to the wiring between the transmission circuit 62 and the receiving circuit 73.

In the embodiments, the motor 30 is provided below the rack shaft 12. However, the invention is not limited to this. For example, the motor 30 may be provided above the rack shaft 12. In the embodiments, the water battery 61 is supplied with water to generate power. However, the embodiments are not limited to this. For example, the invention is not limited to pure water, but impurities may be mixed with water. Alternatively, a liquid may be used such as an electrolytic solution pre-containing an electrolyte.

In the embodiments, the RP-EPS is specifically illustrated. However, the invention is not limited to this. For example, a column-assist EPS may be used. For the column-assist EPS, infiltration of water in the housing 17 can be detected by providing the moisture sensors 63, 64 in the respective insertion portions 17a as in the second embodiment. In the present embodiments, the EPS is taken as an example of the steering system. However, the invention may be applied to steer-by-wire (SBW) systems. The invention is not limited to the SBW but may be embodied as a rear-wheel steering system or a four-wheel steering system.

What is claimed is:

1. A steering system comprising:
   a steered shaft that reciprocates in an axial direction;
   a housing that houses the steered shaft;
   tie rods provided at respective opposite ends of the steered shaft to couple the steered shaft and respective steered wheels together;
   boots each connected between the housing and the corresponding tie rod to seal the housing and the tie rod; and
   a moisture sensor including a water battery that is internally supplied with a liquid to generate power, and a transmission circuit that transmits a wireless signal by use of the water battery as a power supply source, the moisture sensor being disposed inside the housing, wherein
   when the moisture sensor transmits the wireless signal, an alarm unit mounted in a vehicle notifies a driver of an abnormality,
   the alarm unit constitutes an air pressure monitoring system along with a receiving circuit that receives air pressure signals based on air pressures of the steered wheels from air pressure signal transmission circuits provided in the respective steered wheels, and a control circuit that determines whether the steered wheels are abnormal based on the air pressure signals, and
   the wireless signal transmitted from the transmission circuit of the moisture sensor is received by the receiving circuit of the air pressure monitoring system.

2. The steering system according to claim 1, further comprising:
a reduction gear that decelerates a rotation speed of a motor and that transmits the decelerated output; and
a ball screw mechanism that converts the output from the reduction gear into reciprocating motion of the steered shaft in the axial direction, wherein
the housing has an insertion portion through which the steered shaft is inserted and a reduction gear housing that houses the reduction gear and the ball screw mechanism, and
the moisture sensor is disposed in the insertion portion.

3. The steering system according to claim 2, wherein the moisture sensor is disposed below the reduction gear and the ball screw mechanism in a direction of gravity.

4. A moisture sensor comprising:
a water battery that is internally supplied with a liquid to generate power; and
a transmission circuit that transmits a wireless signal by use of the water battery as a power supply source, wherein
when the moisture sensor transmits the wireless signal, an alarm unit mounted in a vehicle notifies a driver of an abnormality,
the alarm unit constitutes an air pressure monitoring system along with a receiving circuit that receives air pressure signals from air pressure signal transmission circuits provided in the respective steered wheels, the air pressure signals being based on air pressures of steered wheels of the vehicle, and a control circuit that determines whether the steered wheels are abnormal based on the air pressure signals, and
the wireless signal transmitted from the transmission circuit of the moisture sensor is received by the receiving circuit of the air pressure monitoring system.

* * * * *